(12) United States Patent
Lee et al.

(10) Patent No.: US 7,875,326 B2
(45) Date of Patent: Jan. 25, 2011

(54) LIQUID CRYSTAL COMPOSITION, LIQUID CRYSTAL DISPLAY HAVING THE LIQUID CRYSTAL COMPOSITION, AND MANUFACTURING METHOD OF THE LIQUID CRYSTAL DISPLAY

(75) Inventors: Jun-Hyup Lee, Seoul (KR); Duck-Jong Suh, Seoul (KR); Won-Gap Yoon, Suwon-si (KR); So-Youn Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 37 days.

(21) Appl. No.: 12/392,358

(22) Filed: Feb. 25, 2009

(65) Prior Publication Data

US 2009/0283204 A1 Nov. 19, 2009

(30) Foreign Application Priority Data

May 13, 2008 (KR) .................. 10-2008-0044083

(51) Int. Cl.
  *C09K 19/30* (2006.01)
  *C09K 19/12* (2006.01)
  *G02F 1/1343* (2006.01)
(52) U.S. Cl. .............. 428/1.1; 252/299.63; 252/299.66; 349/143; 349/182
(58) Field of Classification Search .................. 428/1.1; 252/299.63, 299.66; 349/143, 182
  See application file for complete search history.

(56) References Cited

FOREIGN PATENT DOCUMENTS

| JP | 2003-327964 | 11/2003 |
|----|-------------|---------|
| JP | 2004-204021 | 7/2004 |
| JP | 2004-285353 | 10/2004 |
| JP | 2006-169174 | 6/2006 |
| JP | 2007-126449 | 5/2007 |
| JP | 2007-284439 | 11/2007 |
| JP | 2008-007752 | 1/2008 |
| KR | 10-0264501 | 11/1997 |
| KR | 10-0264713 | 8/2000 |
| KR | 1020070078704 | 8/2007 |

OTHER PUBLICATIONS

Publication No. WO9611897 is the English Abstract for KR10-0264713, (2000).
Publication No. WO9611897 is the English Abstract for KR10-0264501 (2000).

*Primary Examiner*—Shean C Wu
(74) *Attorney, Agent, or Firm*—F. Chau & Associates, LLC

(57) ABSTRACT

A liquid crystal display comprises: a first substrate; a second substrate facing the first substrate; a liquid crystal layer formed between the first substrate and the second substrate, a first electrode formed on one of the first substrate and the second substrate, and a second electrode formed on one of the first substrate and the second substrate. The second electrode forms an electric field to a liquid crystal layer along with the first electrode, and the liquid crystal layer comprises about 25-35 wt % of a compound represented by Chemical Formula 1, and about 9-11 wt % of a compound represented by Chemical Formula 8.

[Chemical Formula 1]

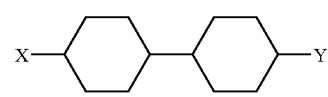

wherein X is an alkyl with a carbon number of 2, and Y is an alkenyl.

[Chemical Formula 8]

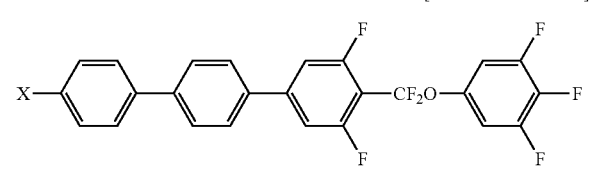

wherein X is an alkyl with a carbon number of 3-7.

18 Claims, 9 Drawing Sheets

LIQUID CRYSTAL COMPOSITION, LIQUID CRYSTAL DISPLAY HAVING THE LIQUID CRYSTAL COMPOSITION, AND MANUFACTURING METHOD OF THE LIQUID CRYSTAL DISPLAY

CROSS-REFERENCE TO RELATED APPLICATION

This application claims priority to and the benefit of Korean Patent Application No. 10-2008-0044083 filed on May 13, 2008, the disclosure of which is hereby incorporated by reference herein in its entirety.

BACKGROUND OF THE INVENTION (a) Technical Field

The present disclosure relates to a liquid crystal composition, a liquid crystal display including the liquid crystal composition, and to a manufacturing method thereof.

(b) Description of the Related Art

A liquid crystal display is one of the flat panel displays that is now being widely used. A liquid crystal display may typically include two display panel sheets in which field generating electrodes such as pixel electrodes and common electrodes are formed, and a liquid crystal layer interposed between the display panels. In the liquid crystal display, a voltage is applied to the field generating electrodes to generate an electric field in the liquid crystal layer, which may determine the direction of liquid crystal molecules of the liquid crystal layer, and an image may be displayed by controlling the polarization of incident light.

The liquid crystal display is used in various display devices, particularly as a display device for a portable device such as a laptop computer. A portable display device should be easy to move and be light weight such that the capacity of a battery thereof is limited, and thus the power consumption of the display device should also be small.

SUMMARY OF THE INVENTION

To reduce the power consumption of a liquid crystal display, the driving voltage should be reduced. In addition, a condition that may realize high speed response and a high contrast ratio under a small driving voltage may be required.

Exemplary embodiments of the present invention may provide a liquid crystal display realizing high speed response and a high contrast ratio under the small driving voltage.

In accordance with an exemplary embodiment of the present invention, a liquid crystal display is provided. The liquid crystal display includes a first substrate a second substrate facing the first substrate, a liquid crystal layer formed between the first substrate and the second substrate, a first electrode formed on one of the first substrate and the second substrate and a second electrode formed on one of the first substrate and the second substrate, and wherein the second electrode forming an electric field to the liquid crystal layer along with the first electrode. The liquid crystal layer comprises about 25-35 wt % of a compound represented by Chemical Formula 1, and about 9-11 wt % of a compound represented by Chemical Formula 8.

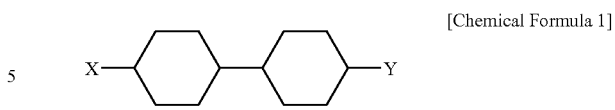

[Chemical Formula 1]

Herein, X is an alkyl with a carbon number of 2, and Y is an alkenyl.

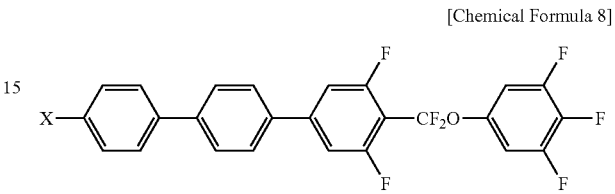

[Chemical Formula 8]

Herein, X is an alkyl with a carbon number of 3-7.

The liquid crystal layer may further comprise about 13-17 wt % of a compound represented by Chemical Formula 5.

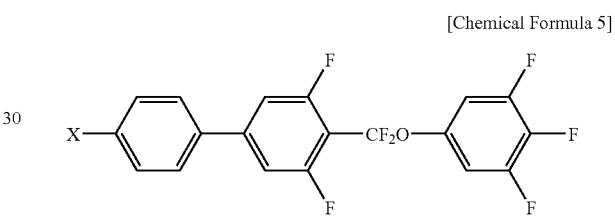

[Chemical Formula 5]

Herein, X is an alkyl with a carbon number of 3-7.

The liquid crystal layer may further comprise about 5-7 wt % of a compound represented by Chemical Formula 2, about 0.5-1.5 wt % of a compound represented by Chemical Formula 3, about 18-24 wt % of a compound represented by Chemical Formula 4, about 9-11 wt % of a compound represented by Chemical Formula 6, and about 8-10 wt % of a compound represented by Chemical Formula 7, and the sum of the compounds represented by Chemical Formulas 1 to 8 may be about 100 wt %.

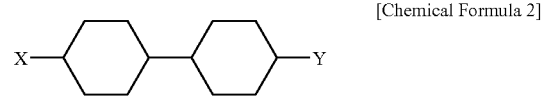

[Chemical Formula 2]

Herein, X is an alkyl with a carbon number of 3-5, and Y is an alkenyl.

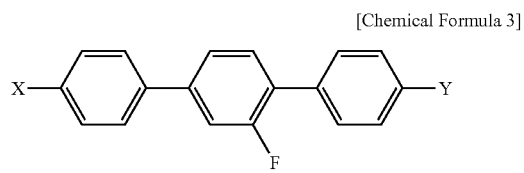

[Chemical Formula 3]

Herein, X is an alkyl with a carbon number of 3-5, and Y is an alkyl with a carbon number of 5-7.

combining the second display panel to the first display panel including the dripped liquid crystal composition. The liquid crystal composition comprises about 25-35 wt % of a compound represented by Chemical Formula 1

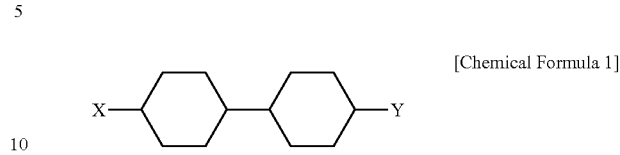
[Chemical Formula 1]

wherein X is an alkyl with a carbon number of 2, and Y is an alkenyl,
about 5-7 wt % of a compound represented by Chemical Formula 2

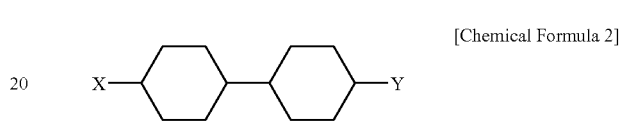
[Chemical Formula 2]

Herein, X is an alkyl with a carbon number of 3-5, and Y is an alkenyl,
about 0.5-1.5 wt % of a compound represented by Chemical Formula 3

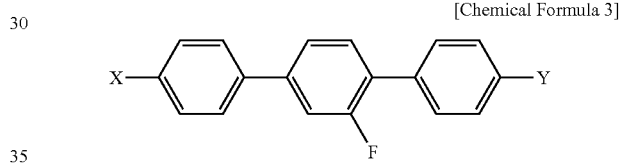
[Chemical Formula 3]

wherein X is an alkyl with a carbon number of 3-5, and Y is an alkyl with a carbon number of 5-7,
about 18-24 wt % of a compound represented by Chemical Formula 4

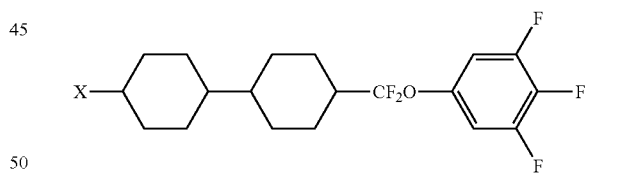
[Chemical Formula 4]

wherein X is an alkyl with a carbon number of 3-7,
about 13-17 wt % of a compound represented by Chemical Formula 5

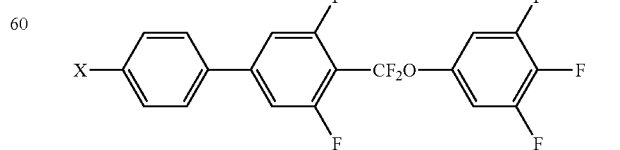
[Chemical Formula 5]

wherein X is an alkyl with a carbon number of 3-7,

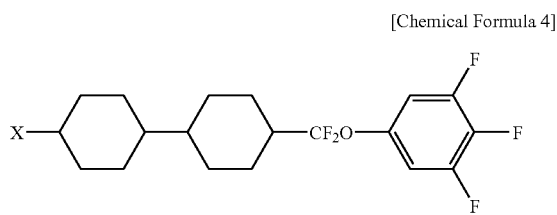
[Chemical Formula 4]

Herein, X is an alkyl with a carbon number of 3-7.

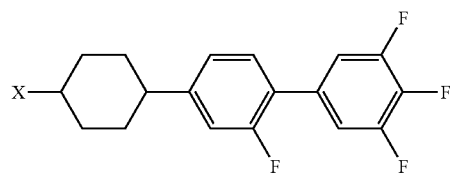
[Chemical Formula 6]

Herein, X is an alkyl with a carbon number of 3-7.

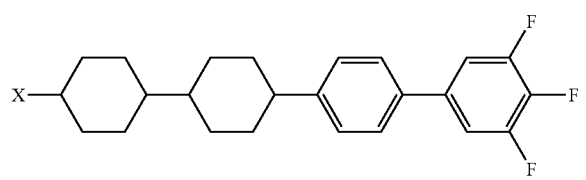
[Chemical Formula 7]

Herein, X is an alkyl with a carbon number of 3-7.

The thickness (cell gap: d) of the liquid crystal layer may be in the range of about 3.8-4.2 μm, and the retardation Δn·d by the liquid crystal layer may be in the range of about 390-430 nm in the absence of application of a voltage to the liquid crystal.

The liquid crystal layer may be arranged with a twisted nematic mode.

The liquid crystal layer may have a phase transition temperature (Tni) of about 74-76° C., refractive anisotropy (Δn) of about 0.099-0.11, dielectric anisotropy (Δ∈) of about 12.5-13.0, and rotation viscosity (γ1) of about 75-84 mPa·s.

A power voltage AVDD may be in the range of about 6.6-7.0V, a minimum luminance voltage (Vb) may be in the range of about 6.5-6.9V, and a maximum luminance voltage (Vw) may be in the range of about 0.5-0.7V.

The liquid crystal display may further comprise a gate line formed on the first substrate, a storage electrode line formed on the first substrate and including a storage electrode, a data line formed on the first substrate, intersecting the gate line and the storage electrode line, and disposed within the width of the storage electrode, and a thin film transistor formed on the first substrate and connected to the data line, the gate line, and the first electrode.

In accordance with an exemplary embodiment of the present invention, a manufacturing method of a liquid crystal display is provided. The method includes providing a first display panel and a second display panel, coating a sealant on the first display panel to define a region for enclosing a liquid crystal composition, dripping a liquid crystal composition in the region for enclosing the liquid crystal composition and about 9-11 wt % of a compound represented by Chemical Formula 6

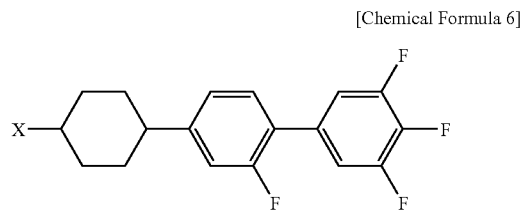
[Chemical Formula 6]

wherein X is an alkyl with a carbon number of 3-7, about 8-10 wt % of a compound represented by Chemical Formula 7

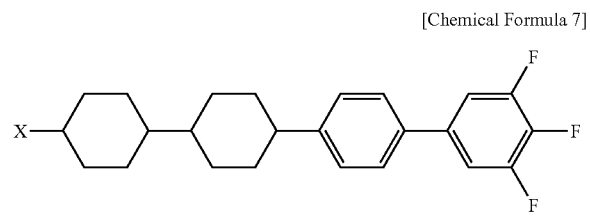
[Chemical Formula 7]

wherein X is an alkyl with a carbon number of 3-7, and about 9-11 wt % of a compound represented by Chemical Formula 8

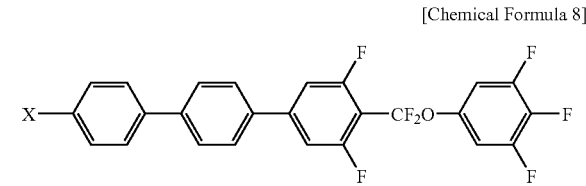
[Chemical Formula 8]

wherein X is an alkyl with a carbon number of 3-7, and the sum of the compounds represented by Chemical Formulas 1 to 8 may be about 100 wt %.

In accordance with an exemplary embodiment of the present invention, a liquid crystal composition is provided. The liquid crystal composition comprises about 25-35 wt % of a compound expressed as Chemical Formula 1,

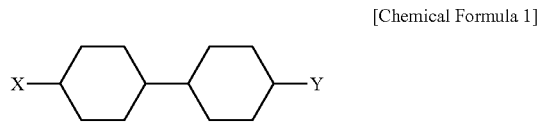
[Chemical Formula 1]

wherein X is an alkyl with a carbon number of 2, and Y is an alkenyl, and about 9-11 wt % of a compound expressed as Chemical Formula 8

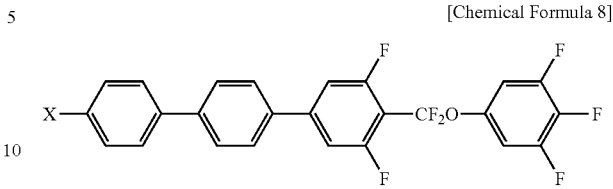
[Chemical Formula 8]

wherein X is an alkyl with a carbon number of 3-7.

The liquid crystal composition may further comprise about 13-17 wt % of a compound expressed as Chemical Formula 5

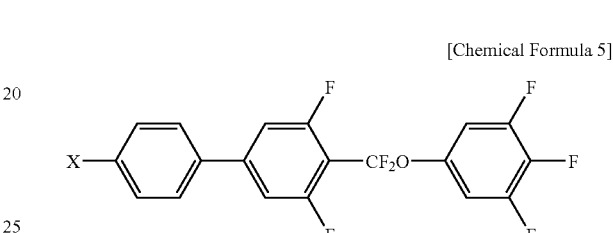
[Chemical Formula 5]

wherein X is an alkyl with a carbon number of 3-7.

The liquid crystal composition may further comprise about 5-7 wt % of a compound represented by Chemical Formula 2,

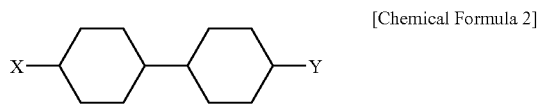
[Chemical Formula 2]

Herein, X is an alkyl with a carbon number of 3-5, and Y is an alkenyl, about 0.5-1.5 wt % of a compound represented by Chemical Formula 3

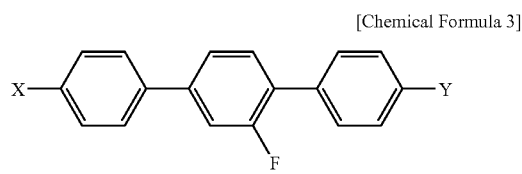
[Chemical Formula 3]

wherein X is an alkyl with a carbon number of 3-5, and Y is an alkyl with a carbon number of 5-7, about 18-24 wt % of a compound represented by Chemical Formula 4

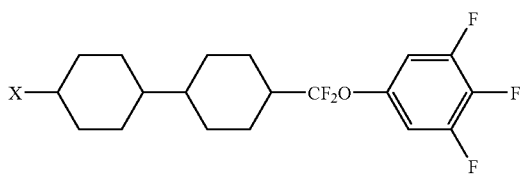
[Chemical Formula 4]

wherein X is an alkyl with a carbon number of 3-7, about 9-11 wt % of a compound represented by Chemical Formula 6

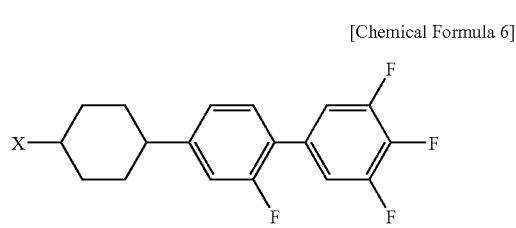

[Chemical Formula 6]

wherein X is an alkyl with a carbon number of 3-7, and about 8-10 wt % of a compound represented by Chemical Formula 7

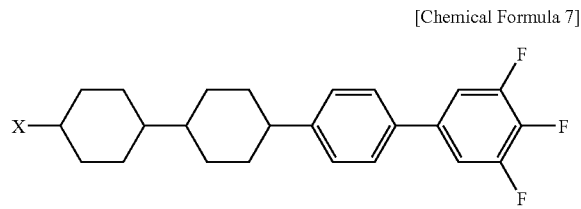

[Chemical Formula 7]

wherein X is an alkyl with a carbon number of 3-7, and the sum of the compounds represented by Chemical Formula 1 to 8 may be about 100 wt %.

A phase transition temperature (Tni) may be in the range of about 74-76° C., refractive anisotropy (Δn) may be in the range of about 0.099-0.11, dielectric anisotropy (Δ∈) may be in the range of about 12.5-13.0, and rotation viscosity (γ1) may be in the range of about 75-84 mPa s.

In accordance with an exemplary embodiment of the present invention, a liquid crystal composition is provided. The liquid crystal composition comprises about 28 wt % of a compound represented by Chemical Formula 1

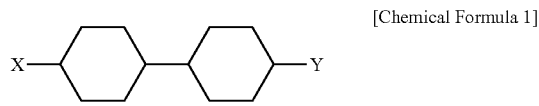

[Chemical Formula 1]

wherein X is an alkyl with a carbon number of 2, and Y is an alkenyl, about 6 wt % of a compound represented by Chemical Formula 2

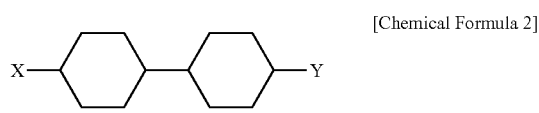

[Chemical Formula 2]

Herein, X is an alkyl with a carbon number of 3-5, and Y is an alkenyl, about 1 wt % of a compound represented by Chemical Formula 3

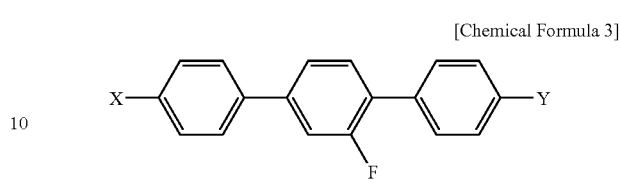

[Chemical Formula 3]

wherein X is an alkyl with a carbon number of 3-5, and Y is an alkyl with a carbon number of 5-7, about 21 wt % of a compound represented by Chemical Formula 4

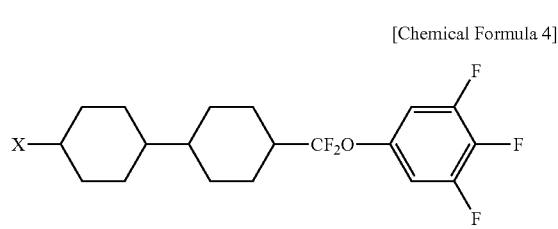

[Chemical Formula 4]

wherein X is an alkyl with a carbon number of 3-7, about 15 wt % of a compound represented by Chemical Formula 5

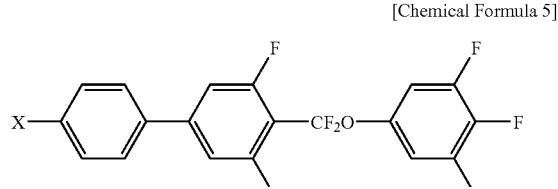

[Chemical Formula 5]

wherein X is an alkyl with a carbon number of 3-7, about 10 wt % of a compound represented by Chemical Formula 6,

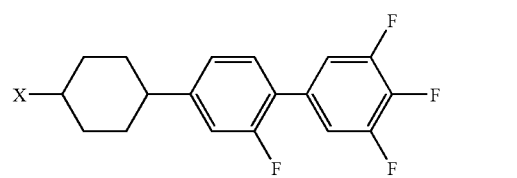

[Chemical Formula 6]

wherein X is an alkyl with a carbon number of 3-7, about 9 wt % of a compound represented by Chemical Formula 7

[Chemical Formula 7]

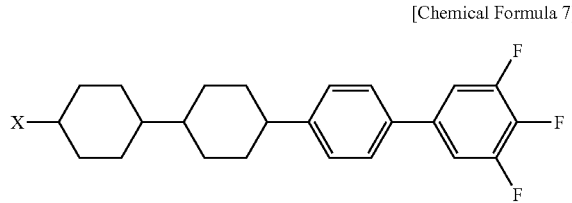

wherein X is an alkyl with a carbon number of 3-7, and about 10 wt % of a compound represented by Chemical Formula 8

[Chemical Formula 8]

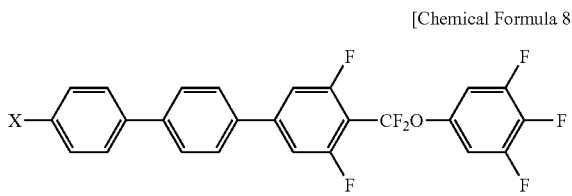

wherein X is an alkyl with a carbon number of 3-7.

By using this liquid crystal composition of exemplary embodiments of the present invention, a liquid crystal display having a high speed response and a high contrast ratio may be provided under a low driving voltage.

BRIEF DESCRIPTION OF THE DRAWINGS

Exemplary embodiments of the present invention can be understood in more detail from the following detailed description taken in conjunction with the accompanying drawings, in which.

DESCRIPTION OF REFERENCE NUMERALS INDICATING PRIMARY ELEMENTS IN THE DRAWINGS

Figure 1:
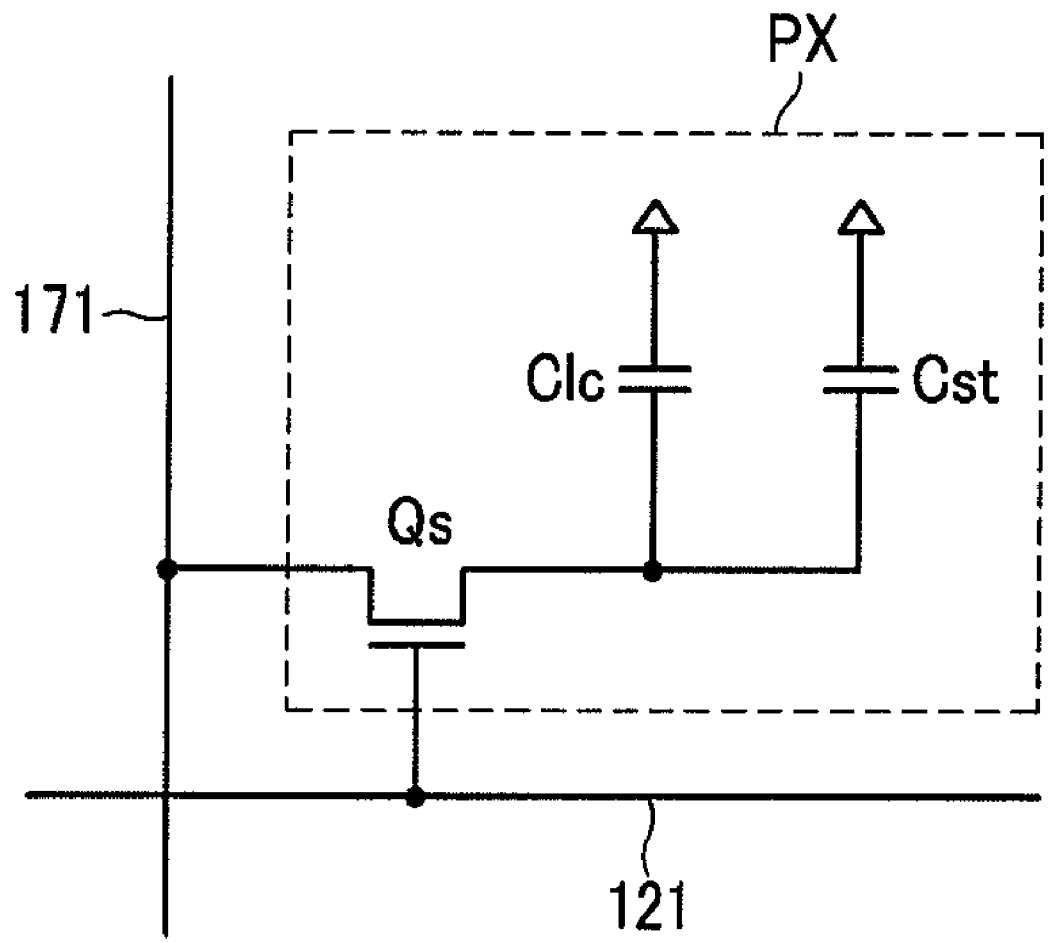
FIG. 1 is an equivalent circuit diagram on one pixel in a liquid crystal display according to an exemplary embodiment of the present invention.

| | |
|---|---|
| 3: liquid crystal layer | 11, 21: alignment layer |
| 12, 22: polarizer | 31, 32, 33: liquid crystal molecule |
| 81, 82: contact assistants | 83: overpass |
| 100: thin film transistor array panel | 110: substrate |
| 121, 129: gate line | 124: gate electrode |
| 131: storage electrode line | 133: storage electrode |
| 140: gate insulating layer | 154: semiconductor |
| 163, 165: ohmic contact | 171, 179: data line |
| 173: source electrode | 175: drain electrode |
| 180: passivation layer | 181, 182, 183a, 183b, 185: contact hole |
| 191: pixel electrode | 200: common electrode panel |
| 210: substrate | 220: light blocking member |
| 230: color filter | 250: overcoat |
| 270: common electrode | 300: liquid crystal display |
| Clc: liquid crystal capacitor and capacitance thereof | |
| Cst: storage capacitor and capacitance thereof | |
| d: cell gap | E: electric field |
| P1, P2: polarization axis | PX: pixel |
| Q: switching element | |

DETAILED DESCRIPTION OF THE EMBODIMENTS

The exemplary embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention will be described in detail with the reference to FIG. 1 to FIG. 5.

Figure 2:
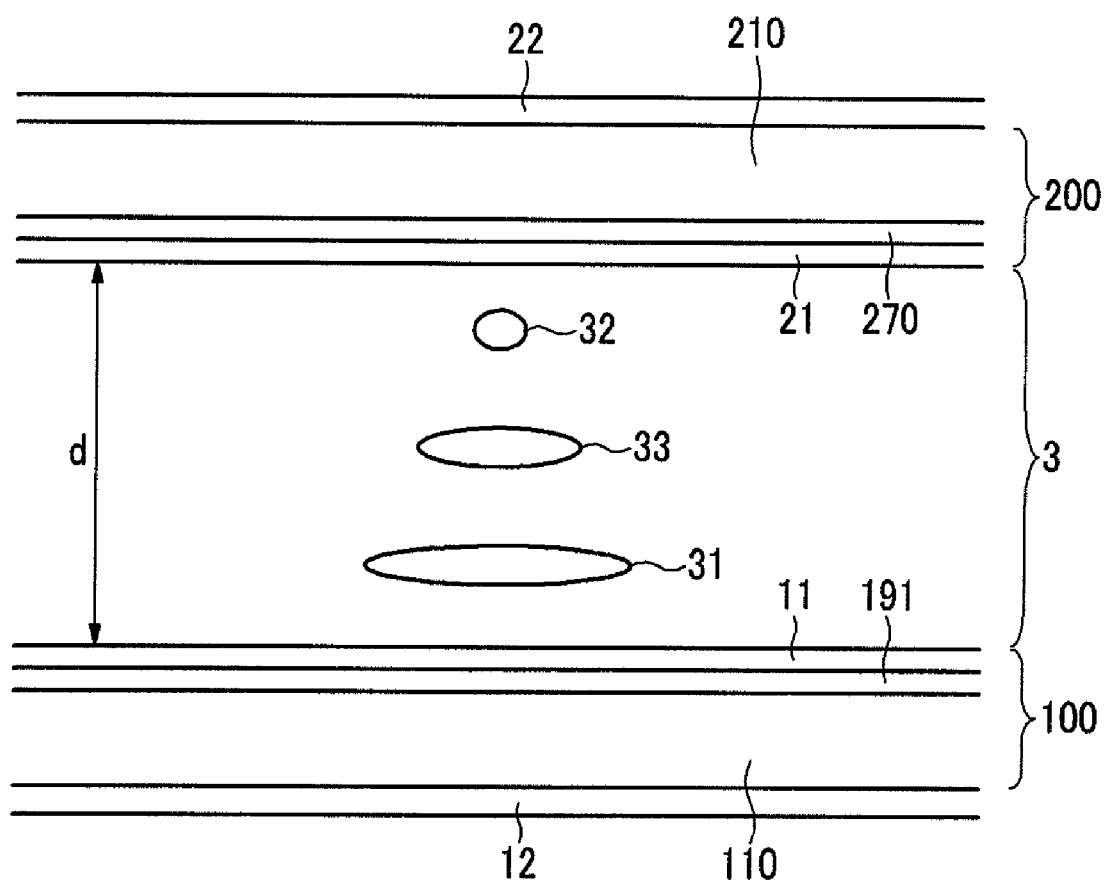
FIG. 2 and FIG. 3 are cross-sectional views of a liquid crystal display according to an exemplary embodiment of the present invention.
Figure 3:
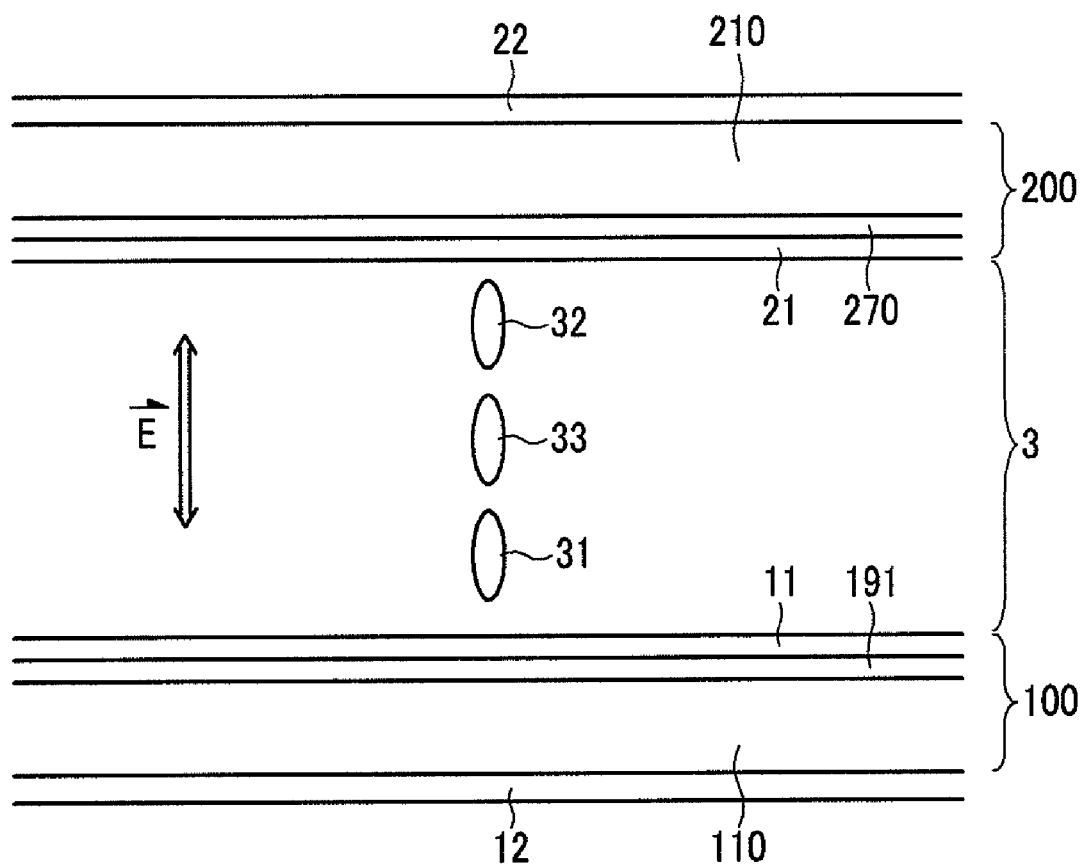
Figure 4:
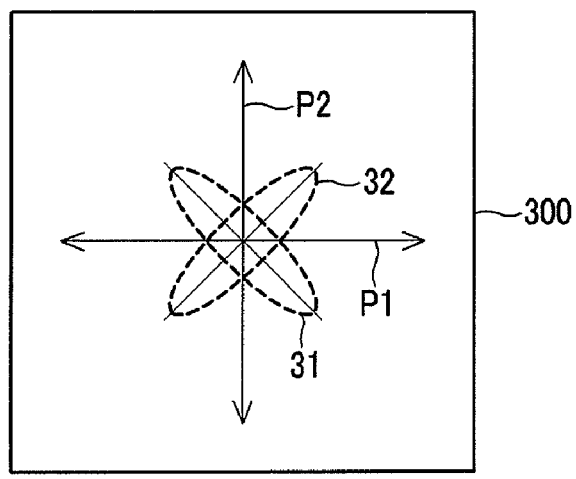
FIG. 4 is a view showing polarization directions in the liquid crystal display according to an exemplary embodiment of the present invention.
Figure 5:
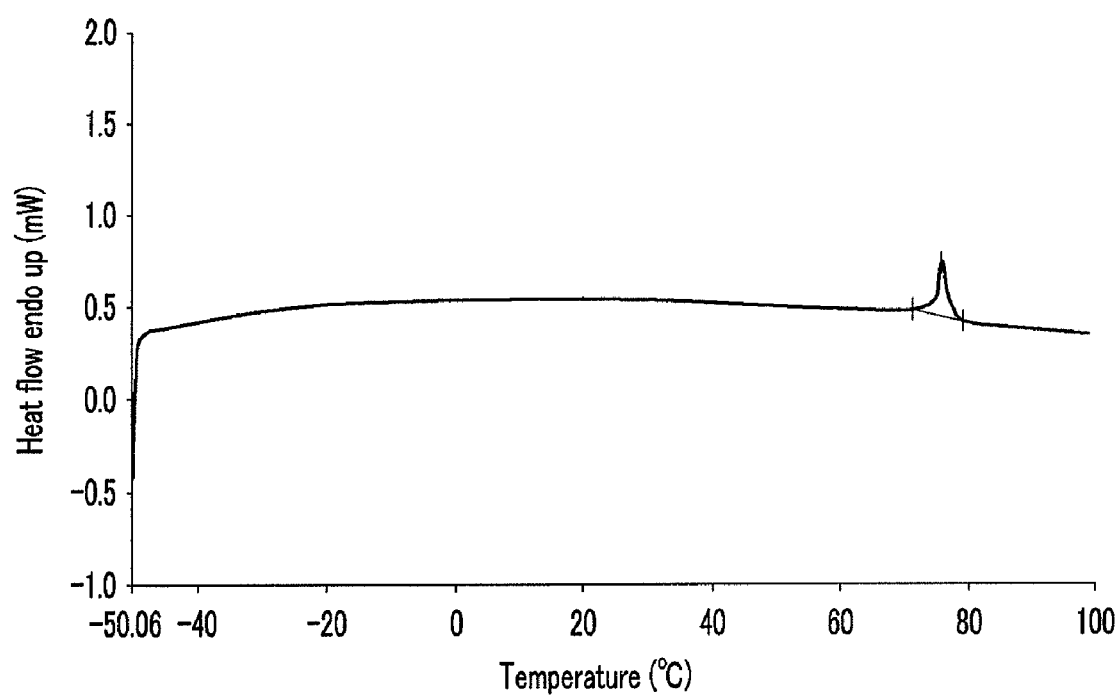
FIG. 5 is result graph of measurement of the liquid crystal composition of an experimental example by using equipment (DSC: differential scanning calorimetry) for measuring phase transition of a liquid crystal.

FIG. 1 is an equivalent circuit diagram on one pixel in a liquid crystal display according to an exemplary embodiment of the present invention, FIG. 2 and FIG. 3 are cross-sectional views of a liquid crystal display according to an exemplary embodiment of the present invention, FIG. 4 is a view showing polarization directions in the polarized in the liquid crystal display according to an exemplary embodiment of the present invention, and FIG. 5 is result graph measuring the liquid crystal composition of an experimental example by using equipment (DSC: differential scanning calorimetry) for measuring a phase transition of a liquid crystal.

Referring to FIG. 1, a liquid crystal display according to the present exemplary embodiment includes a plurality of pixels PX substantially arranged in a matrix, and a plurality of gate lines 121 and a plurality of data lines 171 connected thereto.

The gate lines 121 transmit gate signals, the data lines 171 transmit data voltages, and each pixel includes a switching element Qs, and a liquid crystal capacitor Clc and a storage capacitor Cst connected thereto. The switching element Qs controls the data voltages according to the gate signals, and it is turned-on during a predetermined short time to transmit the data voltages and turned-off during the remaining time. The data voltage applied to the pixel PX is maintained by the liquid crystal capacitor Clc and the storage capacitor Cst. The liquid crystal capacitor Clc includes a liquid crystal composition as a dielectric material, and the storage capacitor Cst includes another insulator.

Referring to FIG. 2 and FIG. 3, the liquid crystal display in exemplary embodiment of the present invention includes a thin film transistor array panel 100 and a common electrode panel 200 facing to each other, and a liquid crystal layer 3 disposed between the two display panels 100 and 200. The liquid crystal display includes a pair of crossed or parallel polarizers 12 and 22 attached on the outer surface of the display panels 100 and 200. FIG. 4 shows the crossed polarizers 12 and 22, FIG. 5 shows the parallel polarizers 12 and 22, and reference numeral 300 indicates the liquid crystal display.

The thin film transistor array panel 100 includes a substrate 110, a plurality of pixel electrodes 191 formed on the inside surface thereof, and a homogeneous alignment layer 11. The common electrode panel 200 includes a substrate 210, a common electrode 270 formed on the inside surface thereof, and a homogeneous alignment layer 21. A pixel electrode 191, the common electrode 270, and the liquid crystal layer 3 interposed therebetween form a liquid crystal capacitor Clc. The common electrode 270 is applied with a predetermined voltage such as a common voltage, and the pixel electrode 191 is applied with the data voltage through the turned-on switching element Q. The pixel electrode 191 may overlap another conductor layer of the thin film transistor array panel 100 to form the storage capacitor Cst.

The liquid crystal layer 3 has positive dielectric anisotropy, and is a twisted nematic (TN) type. That is, in the absence of a voltage, the long axis of liquid crystal molecules 31, 32, and 33 are parallel to the surface of the substrates 110 and 210, and the directions thereof are gradually twisted from the surface of one of the alignment layers 11 and 21 to the surface of the other of the alignment layers 21 and 11. In this state, the direction of the long axis of the liquid crystal molecules 31 disposed near the surface of the alignment layers 11 and 21 may form an angle of approximately 45 degrees by polarization axis P1 and P2 of the polarizers 12 and 22, as shown in FIG. 4.

In this liquid crystal display, as shown in FIG. 3, if a potential difference is generated between the pixel electrodes 191 and the common electrode 270, an electric field E may be formed approximately perpendicular to the surface of the substrate 110 and 210 such that the liquid crystal molecules 31-33 may be rearranged and the long axes thereof tends to be parallel to the direction of the electric field E. If the magnitude of the electric field E is sufficient, the directions of the long axes of the liquid crystal molecules 31-33 may be substantially parallel to the direction of the electric field E.

Light passing through one of the polarizers 12 and 22 may be line-polarized according to the polarization axis P1 and P2, and the polarization thereof may be changed while passing through the liquid crystal layer 3. The incident light having passed through the liquid crystal layer 3 may be line-polarized by the other of the polarizers 22 and 12, and the intensity of the emitted light may be changed according to the change degree of the polarization by the liquid crystal layer 3. The change degree of the polarization of the light passing through the liquid crystal layer 3 may be dependent on the arrangement of the liquid crystal molecules 31-33. For example, as shown in FIG. 3, when the liquid crystal molecules 31-33 are mainly arranged perpendicular to the surface of the substrates 110 and 210, hardly any polarization change of the light passing through the liquid crystal layer 3 is generated. Accordingly, the crossed polarizers 12 and 22 shown in FIG. 4 may block the incident light. In contrast, as shown in FIG. 2, in the absence of the application of the electric field to the liquid crystal layer 3, when the liquid crystal molecules 31-33 are arranged parallel to the surface of the substrates 110 and 210 and are maximally twisted, the polarization change of the light passing through the liquid crystal layer 3 is maximized. Accordingly, the crossed polarizers 12 and 22 shown in FIG. 4 pass most of the incident light. Accordingly, the case of FIG. 4 is referred to as a normally white mode. If necessary, a normally black mode in which the transmissive axis of the two polarizers 12 and 22 are parallel to each other may be used.

The arrangement of the liquid crystal molecules 31-33 may be determined by the intensity of the electric field E, and the intensity of the electric field E may be determined by the voltage difference between the pixel electrodes 191 and the common electrode 270. Therefore, the emitted light having the desired magnitude may be obtained by changing the magnitude of the data voltage applied to the pixel electrodes 191, thereby obtaining the desired luminance of the pixel PX.

In the liquid crystal display according to the present exemplary embodiment, the liquid crystal composition forming the liquid crystal layer 3 includes about 25-35 wt % of a lowest viscosity compound represented by Chemical Formula 1, about 5-7 wt % of a low viscosity compound represented by Chemical Formula 2, about 0.5-1.5 wt % of a neutral compound represented by Chemical Formula 3, about 18-24 wt % of a high polar compound represented by Chemical Formula 4, about 13-17 wt % of a $CF_2O$-containing compound represented by Chemical Formula 5, about 9-11 wt % of a middle polar compound represented by Chemical Formula 6, about 8-10 wt % of a middle polar compound represented by Chemical Formula 7, and about 9-11 wt % of a 4-ring $CF_2O$-containing compound represented by Chemical Formula 8. Here, the total sum of the compounds represented by Chemical Formulas 1 to 8 is about 100 wt %.

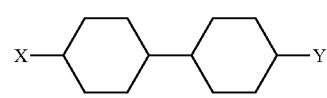

[Chemical Formula 1]

Herein, X is an alkyl with a carbon number of 2, and Y is an alkenyl.

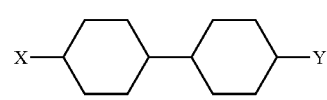

[Chemical Formula 2]

Herein, X is an alkyl with a carbon number of 3-%, and Y is an alkenyl.

[Chemical Formula 3]

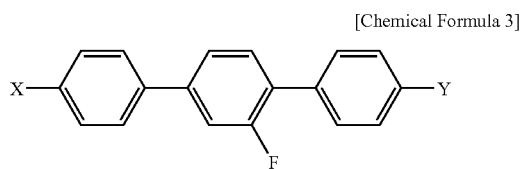

Herein, X is an alkyl with a carbon number of 3-5, and Y is an alkyl with a carbon number of 5-7.

[Chemical Formula 4]

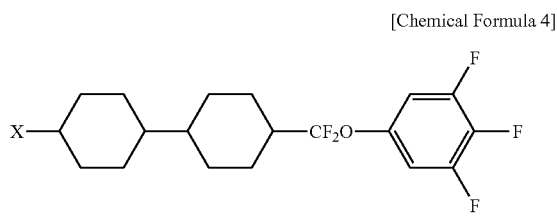

Herein, X is an alkyl with a carbon number of 3-7.

[Chemical Formula 5]

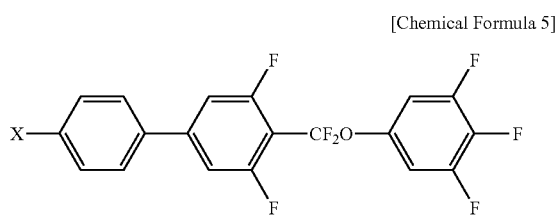

Herein, X is an alkyl with a carbon number of 3-7.

[Chemical Formula 6]

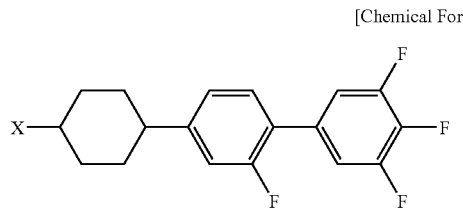

Herein, X is an alkyl with a carbon number of 3-7.

[Chemical Formula 7]

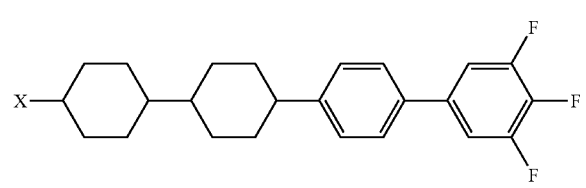

Herein, X is an alkyl with a carbon number of 3-7.

[Chemical Formula 8]

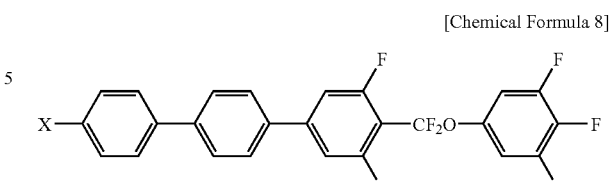

Herein, X is an alkyl with a carbon number of 3-7.

As an example, the liquid crystal composition may include about 28 wt % of the compound represented by Chemical Formula 1, 6 wt % of the compound represented by Chemical Formula 2, about 1 wt % of the compound expressed as Chemical Formula 3, about 21 wt % of the compound represented by Chemical Formula 4, about 15 wt % of the compound represented by Chemical Formula 5, about 10 wt % of the compound represented by Chemical Formula 6, about 9 wt % of the compound represented by Chemical Formula 7, and about 10 wt % of the compound represented by Chemical Formula 8.

This liquid crystal composition includes about 25-35 wt % of the lowest viscosity compound represented by Chemical Formula 1 such that the total viscosity of the liquid crystal composition may be reduced, thereby realizing a high speed response. Also, the liquid crystal composition includes about 9-11 wt % of the high polar 4-ring $CF_2O$-containing compound represented by Chemical Formula 8 such that the liquid crystal composition has sufficient dielectric anisotropy $\Delta\epsilon$ to realize low voltage driving, and about 9-11 wt % of the high polar 4-ring $CF_2O$-containing compound represented by Chemical Formula 8 does not have a phase transition point between about −50° C. and 74° C. such that the reliability at low temperature and high temperature is excellent. Also, about 13-17 wt % of the $CF_2O$-containing compound represented by Chemical Formula 5 provides sufficient dielectric anisotropy $\Delta\epsilon$ along with about 9-11 wt % of the high polar 4-ring $CF_2O$-containing compound of represented by Chemical Formula 8. The remaining compounds expressed as Chemical Formulas 2 to 4, 6, and 7 may be replaced with different compounds having similar physical properties.

The liquid crystal composition used in the liquid crystal display according to the present exemplary embodiment has physical properties of a phase transition temperature Tni of about 74-76° C., refractive anisotropy $\Delta n$ of about 0.099-0.11, dielectric anisotropy $\Delta\epsilon$ of about 12.5-13.0, and rotation viscosity of γ1 of about 75-84 mPa·s.

The liquid crystal display using this liquid crystal composition may realize a response time of about 16-17 ms and a contrast ratio more than about 600:1 through low voltage driving at about 3.3V.

Also, when forming the liquid crystal layer 3 between the two display panels 100 and 200, this liquid crystal composition may apply to a drip injection type, that is, a sealant is coated on one of the two display panels 100 and 200 to define a region enclosing the liquid crystal composition and the liquid crystal is dripped and filled, and then the two display panels 100 and 200 are combined. In the case of the drip injection type, the lowest viscosity compound represented by Chemical Formula 1 has lower volatility, and difficulties may not be generated even if it is volatilized.

The characteristics of the liquid crystal composition according to an exemplary embodiment of the present invention are confirmed through the following experiments.

Table 1 below shows the composition of an experimental example for the liquid crystal composition according to an exemplary embodiment of the present invention, Table 2 shows the composition of the liquid crystal composition used as a comparative example, and Table 3 shows the comparatives of physical properties, response time, and contrast ratio of the experimental example of the present invention and the comparative example.

TABLE 1

| Experimental Example | Compound | Amount | Remark |
|---|---|---|---|
| Neutral compounds | 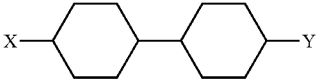<br>Chemical Formula 1 | 28 | X = alkyl (carbon number of 2), Y = alkenyl |
|  | 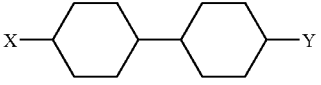<br>Chemical Formula 2 | 6 | X = alkyl (carbon number of 3-5), Y = alkenyl |
|  | 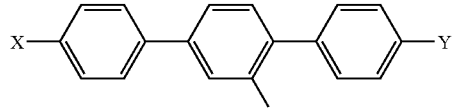<br>Chemical Formula 3 | 1 | X = alkyl (carbon number of 3-5), Y = alkyl (carbon number 5-7) |
| Polar compounds | 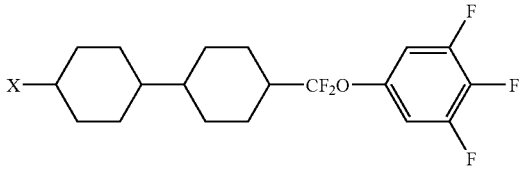<br>Chemical Formula 4 | 21 | X = alkyl (carbon number of 3-7) |
|  | 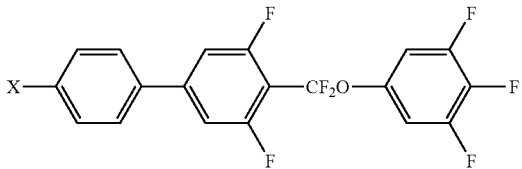<br>Chemical Formula 5 | 15 | X = alkyl (carbon number of 3-7) |
|  | 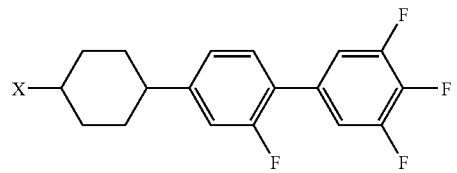<br>Chemical Formula 6 | 10 | X = alkyl (carbon number of 3-7) |
|  | 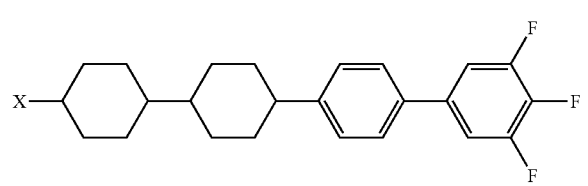<br>Chemical Formula 7 | 9 | X = alkyl (carbon number of 3-7) |

TABLE 1-continued

| Experimental Example | Compound | Amount | Remark |
|---|---|---|---|
| | 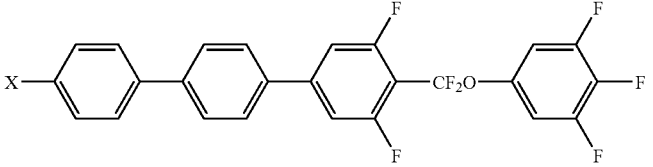<br>Chemical Formula 8 | 10 | X = alkyl (carbon number of 3-7) |

TABLE 2

| Comparative Example | Compound | Amount | Remark |
|---|---|---|---|
| Neutral compounds | 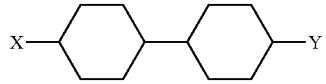<br>Chemical Formula 2 | 29 | X = alkyl (carbon number of 3-5), Y = alkenyl |
| | <br>Chemical Formula 9 | 15 | X = alkyl (carbon number of 3-7), Y = alkyl (carbon number 5-7) |
| | 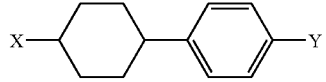<br>Chemical Formula 10 | 5 | X = alkyl (carbon number of 3-7), Y = alkyl (carbon number 5-7) |
| Polar compounds | 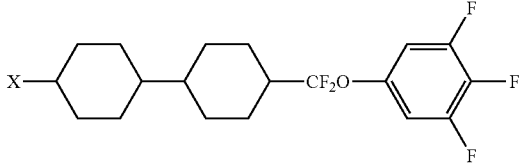<br>Chemical Formula 4 | 14.5 | X = alkyl (carbon number of 3-7) |
| | 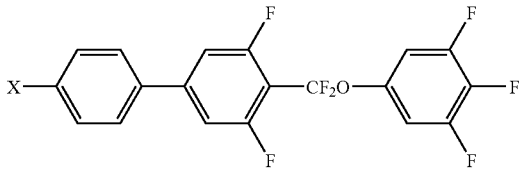<br>Chemical Formula 5 | 15 | X = alkyl (carbon number of 3-7) |
| | 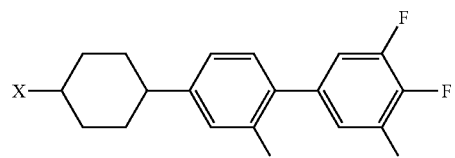<br>Chemical Formula 6 | 8.5 | X = alkyl (carbon number of 3-7) |

TABLE 2-continued

| Comparative Example | Compound | Amount | Remark |
|---|---|---|---|
| | 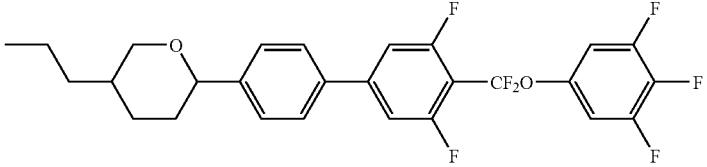<br>Chemical Formula 11 | | 13 |

TABLE 3

| | Divisions | Comparative Example | Experimental Example |
|---|---|---|---|
| Physical properties | Tni | about 75.0° C. | about 74.6° C. |
| | Δn | about 0.1043 | about 0.102 |
| | Δε | about 11.7 | about 12.7 |
| | γ1 | about 85 mPa·s | about 78.9 mPa·s |
| Test cell | Response time | about 8.85 ms | about 8.95 ms |
| | Contrast ratio | about 496:1 | about 625:1 |
| | Reliability at low temperature (about −25° C., about 500 hours) | Generation of a water stain after the passage of 250 hours | Passage of about 500 hours with no problems |

In Table 3, the test cells were manufactured to have a cell gap of about 4 μm, a black voltage (minimum luminance voltage, Vb) of about 6.7V, and a white voltage (maximum luminance voltage, Vw) of about 0.6V.

According to Table 3, the dielectric anisotropy Δε was larger, the rotation viscosity γ1 was lower, the response time was almost the same, and the contrast ratio was improved by about 26% in the case of the experimental example compared with the comparative example. Also, the comparative example generated a water stain in the test of the low temperature reliability such that it did not pass the test, however, the experimental example passed without problems.

The water stain was generated by the generation of the phase transition, and will be described with reference to FIG. 5 to FIG. 8.

Figure 6:
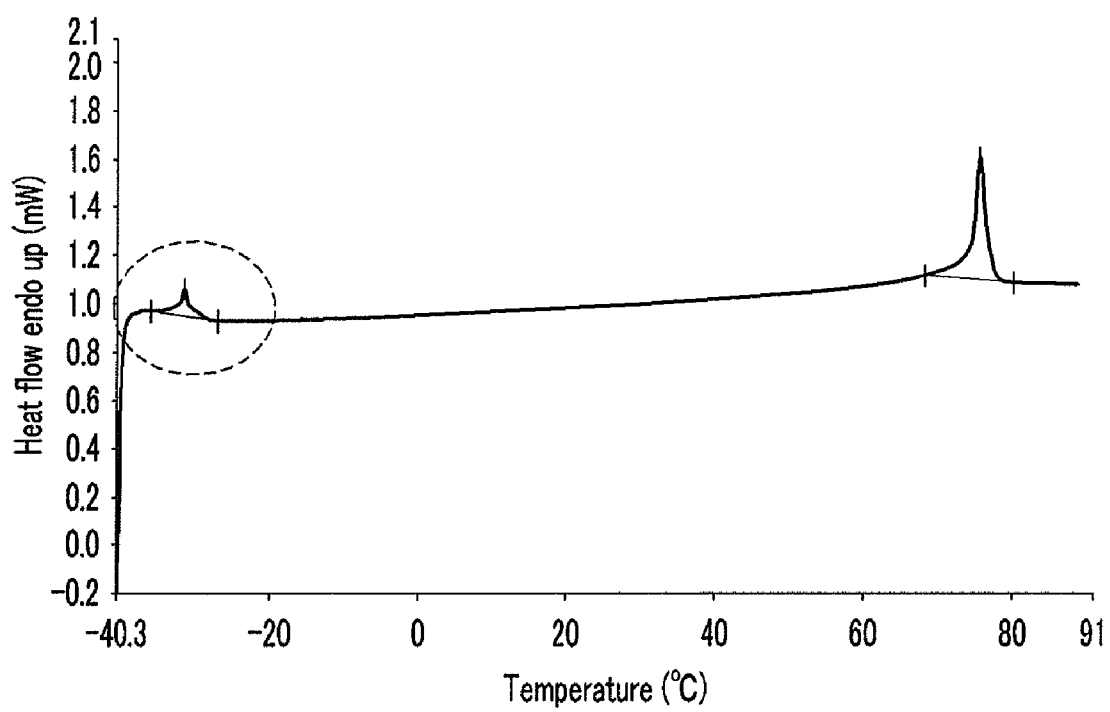
FIG. 6 is a result graph of measurement of a liquid crystal composition of a comparative example by using equipment for measuring phase transition of a liquid crystal.
Figure 7:
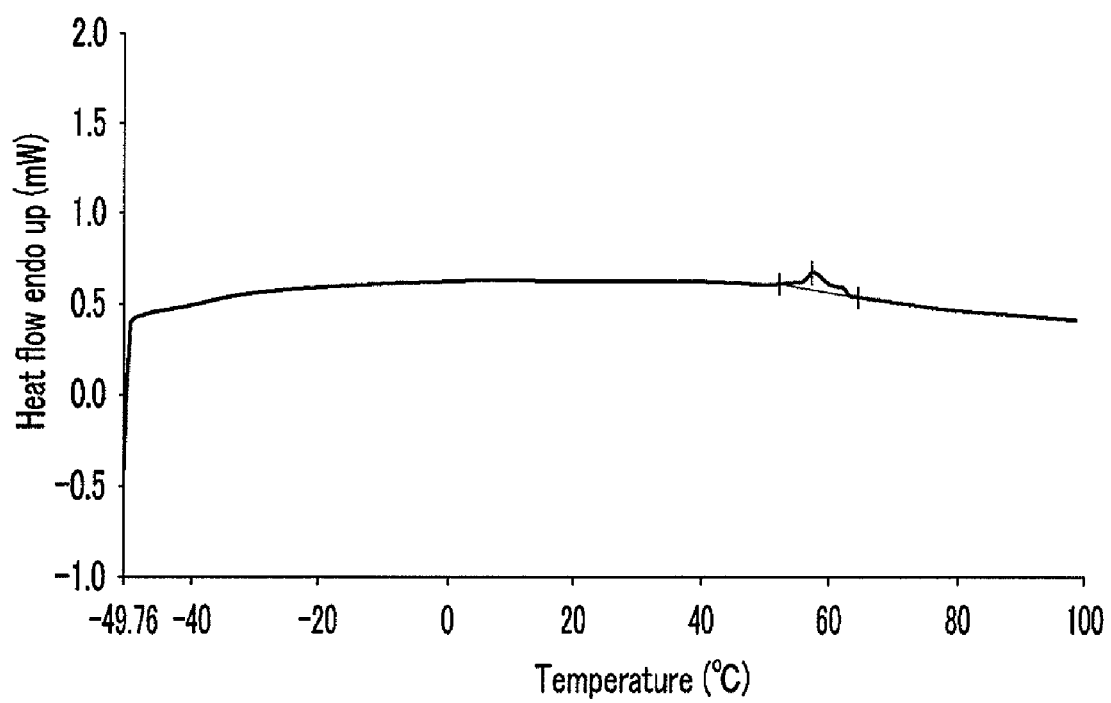
FIG. 7 is a result graph of measurement of the liquid crystal composition of an experimental example doped with a coupling agent.
Figure 8:
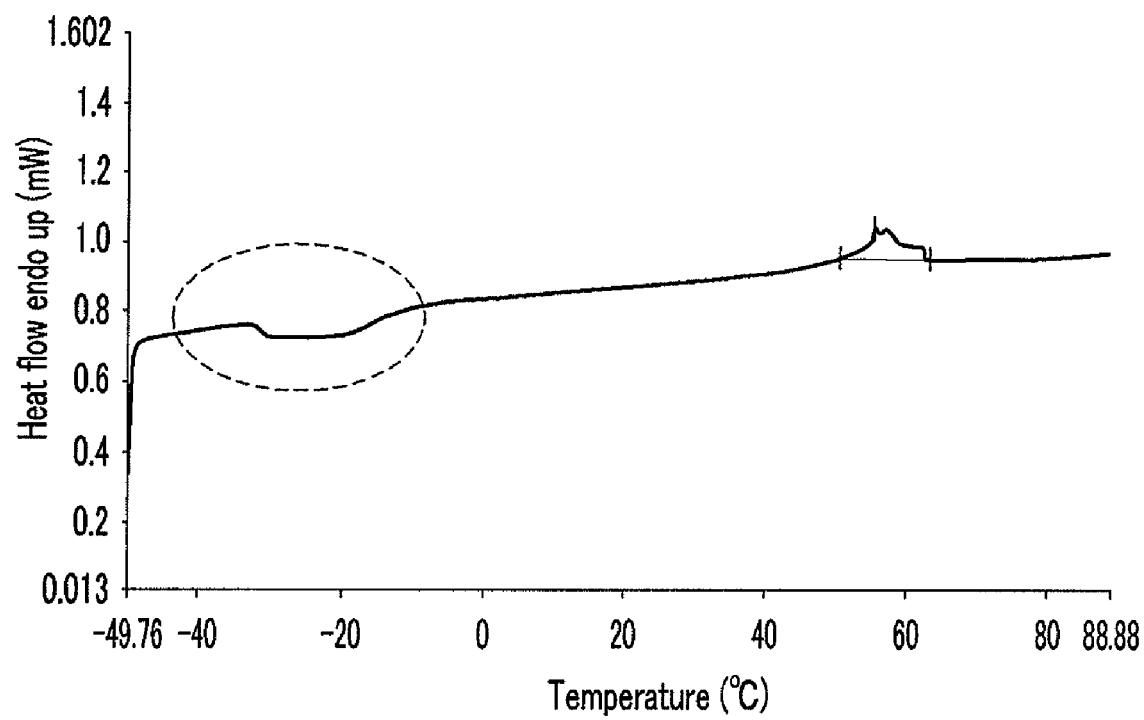
FIG. 8 is a result graph of measurement of a liquid crystal composition of a comparative example doped with a coupling agent.

FIG. 5 is result graph of measurement of the liquid crystal composition of the experimental example using equipment (DSC: differential scanning calorimetry) for measuring phase transition of a liquid crystal, FIG. 6 is a result graph of measurement of a liquid crystal composition of the comparative example by using equipment for measuring phase transition of a liquid crystal, FIG. 7 is a result graph of measurement of the liquid crystal composition of the experimental example doped with a coupling agent, and FIG. 8 is a result graph of measurement of a liquid crystal composition of the comparative example doped with a coupling agent.

In the case of FIG. 5 and FIG. 7, neither a peak nor a singular point was generated at a low temperature of less than about 0. However, a peak was generated near about −31° C. in the case of FIG. 6, and a singular point was generated near about −20° C. in the case of FIG. 8. The peak and the singular point mean that phase transition of the liquid crystal composition was generated at the corresponding temperatures. That is, the phase transition was generated near about −31° C. in the case of the comparative example such that the margin of the low temperature is not sufficient, thereby being represented as the water stain.

The liquid crystal display according to the present exemplary embodiment satisfies the driving conditions of Table 4 and the parameters of the liquid crystal.

TABLE 4

| Divisions | | Acceptable Range | Optimized value |
|---|---|---|---|
| Driving conditions | AVDD | about 6.6-7.0 V | about 6.8 V |
| | Vb | about 6.5-6.9 V | about 6.7 V |
| | Vw | about 0.5-0.7 V | about 0.6 V |
| Parameter of the liquid crystal | Cell gap | about 3.8-4.2 μm | about 4.0 μm |
| | Δn · d | about 390-430 nm | about 410 nm |

That is, the thickness (cell gap: d) of the liquid crystal layer 3 was in the range of about 3.8-4.2 μm, the retardation (Δn·d) by the liquid crystal was in the range of about 390-430 nm in the absence of application of the voltage, the power voltage AVDD was in the range of about 6.6-7.0V, the black voltage (minimum luminance voltage, Vb) was in the range of about 6.5-6.9V, and the white voltage (maximum luminance voltage, Vw) was in the range of about 0.5-0.7V. It may be an optimized condition when the thickness (cell gap: d) of the liquid crystal layer 3 is about 4.0 μm, the retardation Δn·d of the liquid crystal is 410 nm, the power voltage AVDD is about 6.8V, the black voltage Vb is about 6.7V, and the white voltage Vw is about 0.6V.

The driving conditions and the liquid crystal parameters of Table 4 are the preferable ranges for providing the characteristics (e.g., contrast ratio, response speed, necessity of low voltage driving for the reduction of the power consumption) for a portable display device when manufacturing the portable display device using the liquid crystal composition according to an exemplary embodiment of the present invention.

A liquid crystal display satisfying the driving conditions and the liquid crystal parameters of Table 4 was manufactured and the reliability tests were executed, and as a result, it passed all reliability tests such as, for example, HTOL (high temperature operating life), LTOL (low temperature operating life), HTS (high temperature storage), LTS (low temperature storage), THB (temperature, humidity, bias), T/C (thermal cycle), afterimage, HALT (complex test such as high temperature→low temperature→vibration→thermal impact).

Next, a detailed example of the liquid crystal display shown in FIG. 1 to FIG. 4 will be described with reference to FIG. 9 and FIG. 10.

Figure 9:
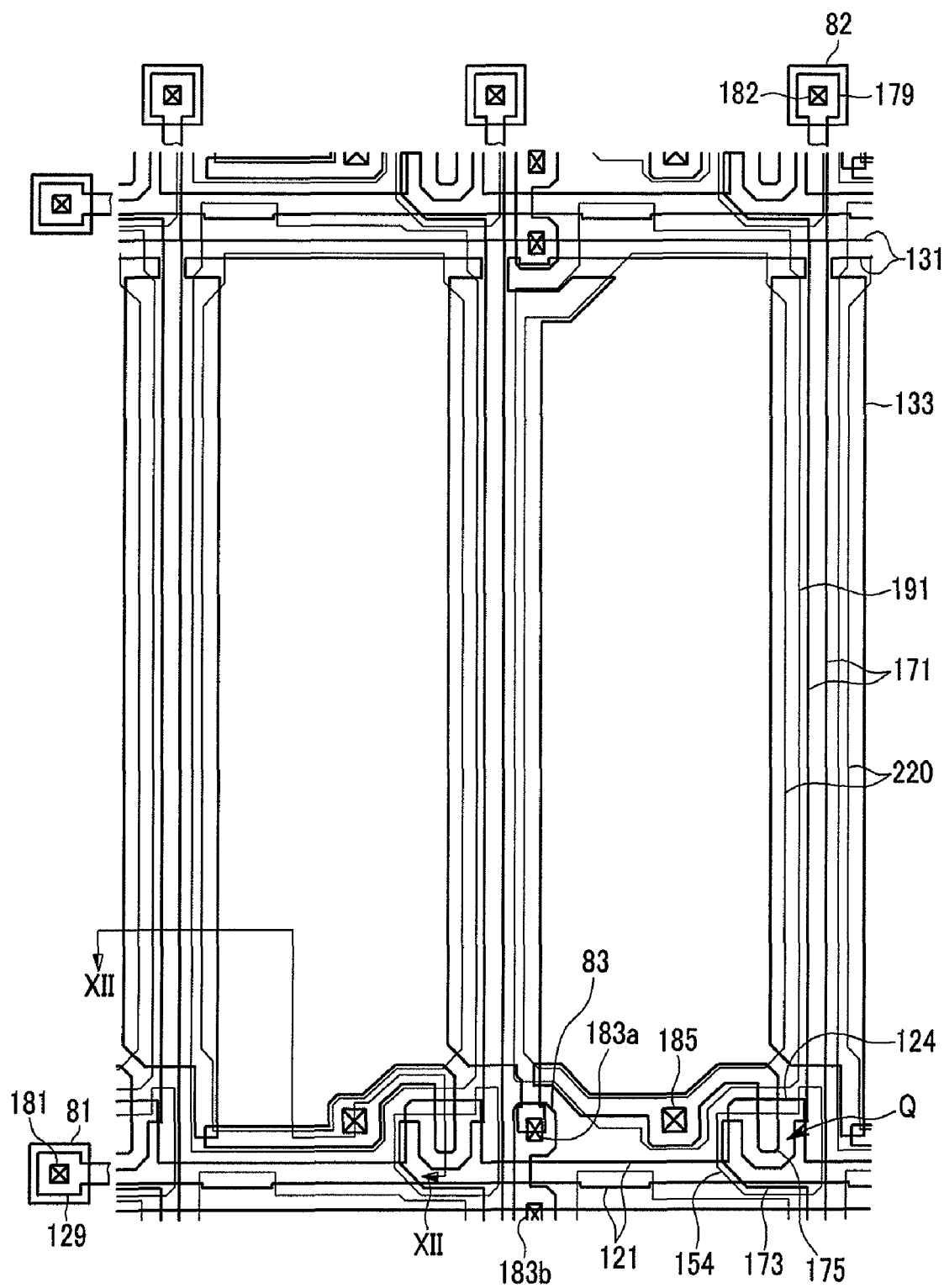
FIG. 9 is a layout view of a liquid crystal display according to an exemplary embodiment of the present invention.
Figure 10:
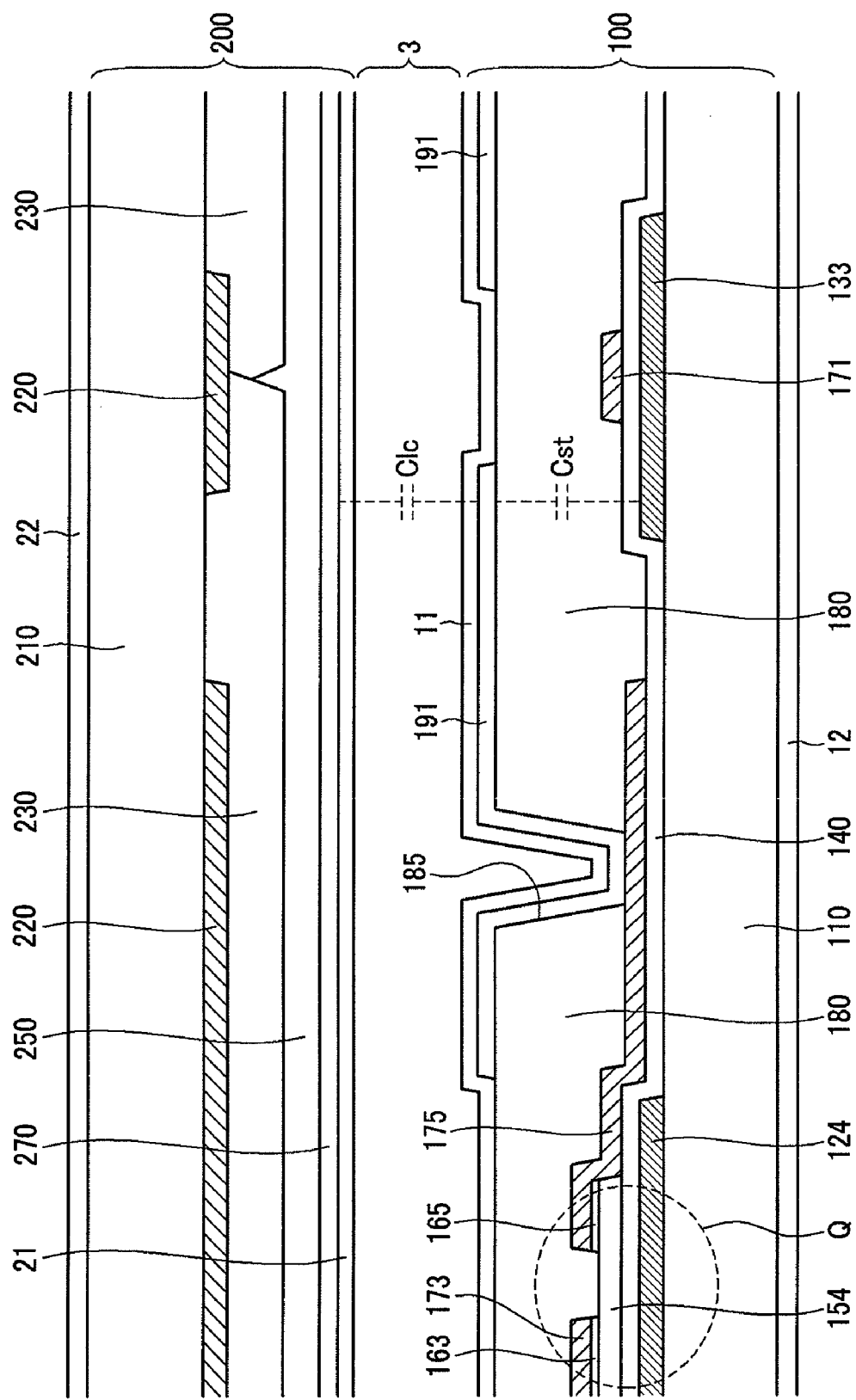
FIG. 10 is a cross-sectional view of the liquid crystal display shown in FIG. 9 taken along the line XII-XII.

FIG. 9 is a layout view of a liquid crystal display according to an exemplary embodiment of the present invention, and FIG. 10 is a cross-sectional view of the liquid crystal display shown in FIG. 9 taken along the line XII-XII.

Referring to FIG. 9 and FIG. 10, a liquid crystal display according to an exemplary embodiment of the present invention includes a thin film transistor array panel 100, a common electrode panel 200, a liquid crystal layer 3, and polarizers 12 and 22.

Firstly, the common electrode panel 200 will be described.

A light blocking member is formed on an insulating substrate 210 made of a material such as, for example, a transparent glass or plastic. The light blocking member 220 is referred to as a black matrix, and includes a plurality of openings arranged in a matrix form.

A plurality of color filters 230 are formed on the substrate 210. The color filters 230 are mainly disposed in the openings, and may extend according to the column of the openings in the longitudinal direction. Each color filter 230 may display one of primary colors such as, for example, three primary colors of red, green, and blue. Neighboring color filters 230 may be overlapped to each other.

An overcoat 250 is formed on the color filters 230 and the light blocking member 220. The overcoat 250 may be made of, for example, an (organic) insulating material, and it may prevent the color filters 230 from being exposed and provide a flat surface. The overcoat 250 may be omitted.

A common electrode 270 is formed on the overcoat 250. The common electrode 270 is made of a transparent conductor such as, for example, indium tin oxide (ITO) or indium zinc oxide (IZO).

An alignment layer 21 is formed on the common electrode 270. The alignment layer 21 may be rubbed in one direction as a homogeneous alignment layer.

Next, the thin film transistor array panel will be described.

A plurality of gate lines 121 and storage electrode lines 131 are formed on an insulation substrate 110 made of a material such as, for example, transparent glass or plastic.

The gate lines 121 transmit gate signals and extend in the transverse direction. The gate lines 121 include a plurality of gate electrodes 124 extending upward, and an end portion 129 having a wide width for connection to an external circuit. A gate driving circuit generating gate signals may be mounted on a flexible printed circuit film attached to the substrate 110, or may be mounted directly on the substrate 110 or integrated with the substrate 110. The gate lines 121 may be extended and directly connected to the gate driving circuit integrated with the substrate 110.

The storage electrode lines 131 includes a stem substantially parallel to the gate lines 121 and a plurality of storage electrodes 133 branched from the stem, and are supplied with a predetermined voltage. The storage electrode lines 131 are disposed between two neighboring gate lines 121, and the stem line is disposed close to the upper side of two gate lines 121. The storage electrodes 133 include a fixed end connected to the stem, a free end opposite to the fixed end, and a main body therebetween. The fixed end and the free end have narrower widths than the main body, the fixed end is connected to the center of the main body, and the free end is connected to one side of the main body. The right-upper portion of the main body of the storage electrode 133 has a different shape other portions. In FIG. 9, the storage electrode 133 illustrated at the center is protruded in the right side. However, the storage electrode 133 illustrated on both sides thereof is smooth. Also, the shape and the arrangement of the storage electrode lines 131 may be changed in the various forms.

A gate insulating layer 140 that may be made of, for example, silicon nitride (SiNx) or silicon oxide (SiOx) is formed on the gate lines 121 and the storage electrode lines 131.

Semiconductor islands 154 that may be made of, for example, hydrogenated amorphous silicon (simply referred to as a-Si) or polysilicon are formed on the gate insulating layer 140. Each semiconductor island 154 is disposed on a gate electrode 124, and the right-upper portion thereof is protruded upward.

A pair of ohmic contact islands 163 and 165 are formed on each semiconductor island 154. For example, the ohmic contacts islands 163 and 165 may be formed of n+ hydrogenated amorphous silicon heavily doped with an n-type impurity such as phosphorous, or they may be made of silicide.

Data lines 171 and drain electrodes 175 are formed on the ohmic contacts 163 and 165 and the gate insulating layer 140.

The data lines 171 extend in the longitudinal direction thereby intersecting the gate lines 121 near the gate electrodes 124. The data lines 171 also intersect the storage electrode lines 131 and overlap the storage electrodes 133. Each data line 171 includes a source electrode 173 extending toward a gate electrode 124 and curved like a character "J", and an end portion 179 having a wide area for contact with another layer or an external driving circuit. A data driving circuit generating data voltages may be mounted on a flexible printed circuit film attached to the substrate 110 or directly mounted thereon, or may be integrated with the substrate 110. The data lines 171 may be extended and directly connected to the gate driving circuit integrated with the substrate 110.

Each drain electrode 175 starts from one end portion enclosed by a source electrode 173 on a gate electrode 124, curves in the transverse direction and is elongated, and has a portion having a wide area in the center. The shape of the drain electrode 175 is different in the every other one. The drain electrode 175 disposed in a pixel where a overpass 83 is disposed is bent upward.

A gate electrode 124, a source electrode 173, and a drain electrode 175 form a thin film transistor (TFT) such as the switching element Qs shown in FIG. 1 along with a semiconductor island 154, and the channel of the thin film transistor is formed in the semiconductor island 154 between the source electrode 173 and the drain electrode 175.

The ohmic contacts 163 and 165 are interposed only between the underlying semiconductor islands 154 and the overlying data lines 171 and drain electrodes 175, and reduce contact resistance therebetween. The semiconductor islands 154 include a portion between the source electrodes 173 and the drain electrodes 175, and portions exposed by the data lines 171 and the drain electrodes 175.

A passivation layer 180 is formed on the data lines 171, the drain electrodes 175, and the exposed semiconductor islands 154. The passivation layer 180 may be made of, for example, an inorganic insulator or an organic insulator and have a flat surface. Examples of the inorganic insulator may be silicon nitride and silicon oxide. The organic insulator may have, for example, photosensitivity and a dielectric constant thereof may be less than about 4.0. Also, the passivation layer 180 may have, for example, a dual-layered structure of a lower inorganic layer and an upper organic layer so as to not cause damage to the exposed portions of the semiconductors 154 while maintaining the excellent insulating characteristics of the organic layer.

The passivation layer 180 has a plurality of contact holes 182 and 185 respectively exposing the end portions 179 of the data lines 171 and the drain electrodes 175. The passivation layer 180 and the gate insulating layer 140 include contact holes 181 exposing the end portions 129 of the gate lines 121, contact holes 183b exposing a portion of the branches of the storage electrode lines 131 near the fixed end of the storage electrodes 133, and contact holes 183b exposing the free ends of the storage electrodes 133. The contact holes 183a and 183b are only disposed on the protruded right-upper edges of the storage electrodes 133 and the protruded portions of the drain electrodes 175.

A pixel electrode 191, an overpass 83, and contact assistants 81 and 82 are formed on the passivation layer 180. They are preferably made of, for example, a transparent conductor such as ITO or IZO, or a reflective conductor such as silver, aluminum, chromium, or alloys thereof.

The pixel electrodes 191 are physically and electrically connected to the drain electrodes 175 through the contact holes 185, and receive data voltages from the drain electrodes 175. The pixel electrodes 191 overlap the common electrode 270 via the liquid crystal layer 3 to form liquid crystal capacitors Clc, and overlap the storage electrode lines 131 as well as the storage electrodes 133 to form storage capacitors Cst. The capacitance of the storage capacitors Cst may be controlled by controlling the overlapping areas between the pixel electrodes 191 and the storage electrode lines 131. However, if the overlapping area is increased to increase capacitance, the aperture ratio may be reduced.

The pixel electrodes 191 face the openings of the light blocking members 220, and the drain electrodes 175 overlap the pixel electrodes 191 according to the lower edges of the pixel electrodes 191.

The overpasses 83, traversing the gate lines 121, are connected with the exposed portions of the branches of the storage electrode lines 131 and the exposed end portions of the free ends of the storage electrodes 133a via the contact holes 183a and 183b positioned at the opposite side of the gate lines 121. The overpasses 83 are disposed one by one per two pixels in the row direction, and the shapes of the pixel electrodes 191, the drain electrodes 175, the storage electrodes 133, and the light blocking member 220 are changed according to the existence of the overpasses 83. That is, a corner of each pixel electrode 191 is cut at a position where an overpass 83 is disposed such that the shape of the drain electrodes 175, the storage electrodes 133, and the light blocking member 220 are changed according to the shape of the pixel electrodes. The storage electrode lines 131 including the storage electrodes 133 may be used, for example, to repair defects of the gate lines 121, the data lines 171, or the thin film transistors, along with the overpasses 83.

In the structure of the above-described liquid crystal display, the overlapping area between a data line 171 and a storage electrode 133 is wide such that power consumption may be increased due to coupling therebetween. However, the liquid crystal layer 3 is formed of the liquid crystal composition according to an exemplary embodiment of the present invention including about 25-35 wt % of a lowest viscosity compound represented by Chemical Formula 1, about 5-7 wt % of a low viscosity compound represented by Chemical Formula 2, about 0.5-1.5 wt % of a neutral compound represented by Chemical Formula 3, about 18-24 wt % of a high polar compound represented by Chemical Formula 4, about 13-17 wt % of a $CF_2O$-containing compound represented by Chemical Formula 5, about 9-11 wt % of a middle polar compound represented by Chemical Formula 6, about 8-10 wt % of a middle polar compound represented by Chemical Formula 7, and about 9-11 wt % of a 4-ring $CF_2O$-containing compound represented by Chemical Formula 8, such that the low voltage driving may be realized, thereby reducing the power consumption. Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal display comprising:
a first substrate;
a second substrate facing the first substrate;
a liquid crystal layer formed between the first substrate and the second substrate;
a first electrode formed on one of the first substrate and the second substrate; and
a second electrode formed on one of the first substrate and the second substrate, and the second electrode forming an electric field to the liquid crystal layer along with the first electrode,
wherein the liquid crystal layer comprising:
about 25-35 wt % of a compound represented by Chemical Formula 1, and
about 9-11 wt % of a compound represented by Chemical Formula 8,

[Chemical Formula 1]

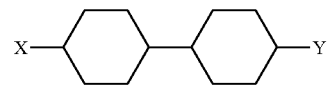

wherein X is an alkyl with a carbon number of 2, and Y is an alkenyl,

[Chemical Formula 8]

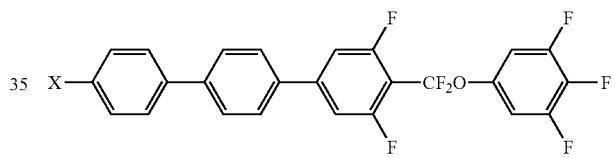

wherein X is an alkyl with a carbon number of 3-7.

2. The liquid crystal display of claim 1, wherein the liquid crystal layer further comprises about 13-17 wt % of a compound represented by as Chemical Formula 5,

[Chemical Formula 5]

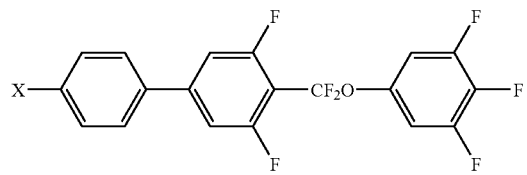

wherein X is an alkyl with a carbon number of 3-7.

3. The liquid crystal display of claim 2, wherein the liquid crystal layer further comprises:
about 5-7 wt % of a compound represented by Chemical Formula 2;
about 0.5-1.5 wt % of a compound represented by Chemical Formula 3;
about 18-24 wt % of a compound represented by Chemical Formula 4;
about 9-11 wt % of a compound represented by Chemical Formula 6; and
about 8-10 wt % of a compound represented by Chemical Formula 7, wherein the sum of the compounds represented by Chemical Formulas 1 to 8 forms about 100 wt %,

[Chemical Formula 2]

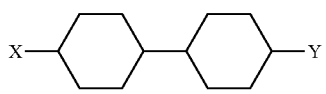

wherein X is an alkyl with a carbon number of 3-5, and Y is an alkenyl,

[Chemical Formula 3]

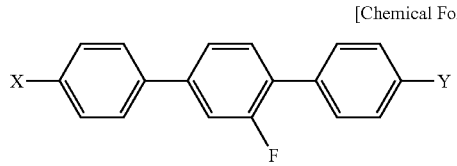

wherein X is an alkyl with a carbon number of 3-5, and Y is an alkyl with a carbon number of 5-7,

[Chemical Formula 4]

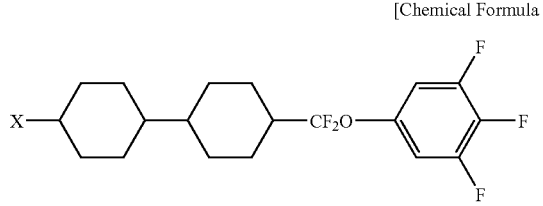

wherein X is an alkyl with a carbon number of 3-7,

[Chemical Formula 6]

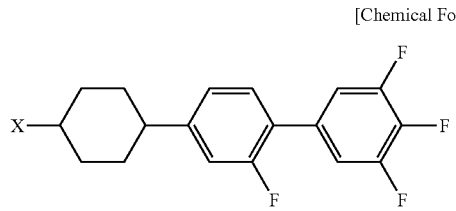

wherein X is an alkyl with a carbon number of 3-7, and

[Chemical Formula 7]

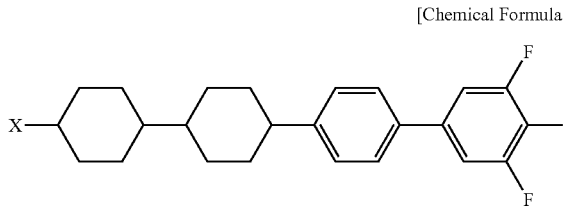

wherein X is an alkyl with a carbon number of 3-7.

4. The liquid crystal display of claim 3, wherein:
a thickness (cell gap: d) of the liquid crystal layer is in a range of about 3.8-4.2 µm, and a retardation Δn·d by the liquid crystal layer is in a range of about 390-430 nm in the absence of application of a voltage to the liquid crystal.

5. The liquid crystal display of claim 4, wherein
the liquid crystal layer is arranged with a twisted nematic mode.

6. The liquid crystal display of claim 5, wherein:
the liquid crystal layer has a phase transition temperature (Tni) of about 74-76° C., a refractive anisotropy (Δn) of about 0.099-0.11, a dielectric anisotropy (Δ∈) of about 12.5-13.0, and a rotation viscosity (¥1) of about 75-84 mPa·s.

7. The liquid crystal display of claim 6, wherein
a power voltage AVDD is in a range of about 6.6-7.0V, a minimum luminance voltage (Vb) is in a range of about 6.5-6.9V, and a maximum luminance voltage (Vw) is in a range of about 0.5-0.7V.

8. The liquid crystal display of claim 1, wherein
the liquid crystal layer has a phase transition temperature (Tni) of about 74-76° C., a refractive anisotropy (Δn) of about 0.099-0.11, a dielectric anisotropy (Δ∈) of about 12.5-13.0, and a rotation viscosity (¥1) of about 75-84 mPa·s.

9. The liquid crystal display of claim 8, wherein
a thickness (cell gap: d) of the liquid crystal layer is in a range of about 3.8-4.2 µm, and a retardation Δn·d by the liquid crystal layer is in a range of about 390-430 nm in the absence of application of a voltage to the liquid crystal.

10. The liquid crystal display of claim 9, wherein
a power voltage AVDD is in a range of about 6.6-7.0V, a minimum luminance voltage (Vb) is in a range of 6.5-6.9V, and maximum luminance voltage (Vw) is in a range of about 0.5-0.7V.

11. The liquid crystal display of claim 1, further comprising:
a gate line formed on the first substrate;
a storage electrode line formed on the first substrate and including a storage electrode;
a data line formed on the first substrate, intersecting the gate line and the storage electrode line, and disposed within the width of the storage electrode; and
a thin film transistor formed on the first substrate, and connected to the data line, the gate line, and the first electrode.

12. A method for manufacturing a liquid crystal display comprising:
providing a first display panel and a second display panel;
coating a sealant on the first display panel to define a region for enclosing a liquid crystal composition;
dripping a liquid crystal composition in the region for enclosing the liquid crystal composition; and
combining the second display panel to the first display panel including the dripped liquid crystal composition,
wherein the liquid crystal composition comprising:
about 25-35 wt % of a compound represented as Chemical Formula 1,

[Chemical Formula 1]

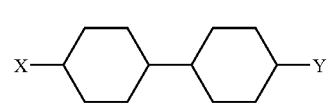

wherein X is an alkyl with a carbon number of 2, and Y is an alkenyl;
about 5-7 wt % of a compound represented by Chemical Formula 2,

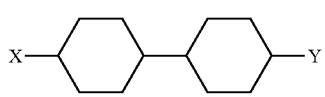
[Chemical Formula 2]

wherein X is an alkyl with a carbon number of 3-5, and Y is an alkenyl;
about 0.5-1.5 wt % of a compound represented by Chemical Formula 3,

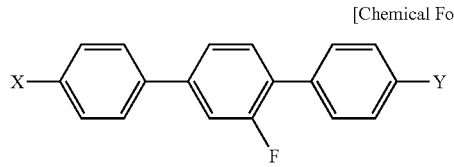
[Chemical Formula 3]

wherein X is an alkyl with a carbon number of 3-5, and Y is an alkyl with a carbon number of 5-7;
about 18-24 wt % of a compound represented by Chemical Formula 4,

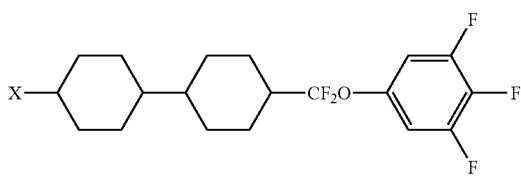
[Chemical Formula 4]

wherein X is an alkyl with a carbon number of 3-7;
about 13-17 wt % of a compound represented by Chemical Formula 5,

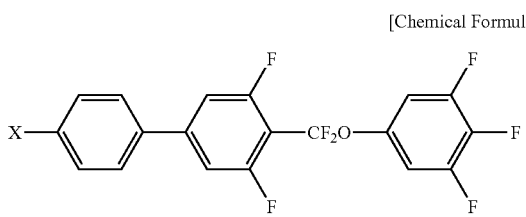
[Chemical Formula 5]

wherein X is an alkyl with a carbon number of 3-7;
about 9-11 wt % of a compound represented by Chemical Formula 6,

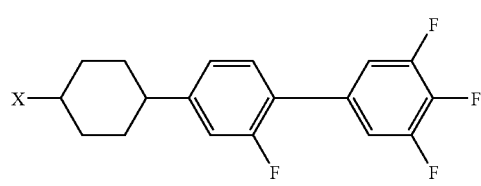
[Chemical Formula 6]

wherein X is an alkyl with a carbon number of 3-7;
about 8-10 wt % of a compound represented by Chemical Formula 7

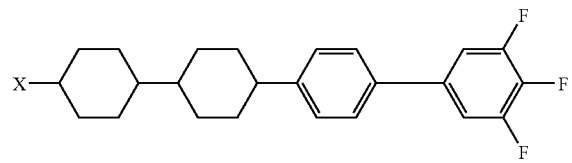
[Chemical Formula 7]

wherein X is an alkyl with a carbon number of 3-7;
and
about 9-11 wt % of a compound represented by Chemical Formula 8

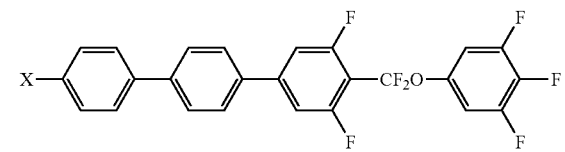
[Chemical Formula 8]

wherein X is an alkyl with a carbon number of 3-7
and
the sum of the compounds represented by Chemical Formulas 1 to 8 forms about 100 wt %.

13. A liquid crystal composition comprising:
about 25-35 wt % of a compound represented by Chemical Formula 1

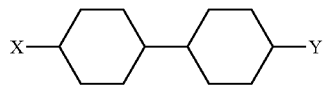
[Chemical Formula 1]

wherein X is an alkyl with a carbon number of 2, and Y is an alkenyl;
and about 9-11 wt % of a compound represented by Chemical Formula 8

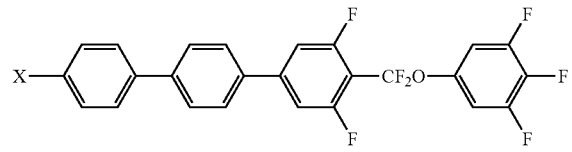
[Chemical Formula 8]

wherein X is an alkyl with a carbon number of 3-7.

14. The liquid crystal composition of claim 13, further comprising
about 13-17 wt % of a compound represented by Chemical Formula 5

[Chemical Formula 5]

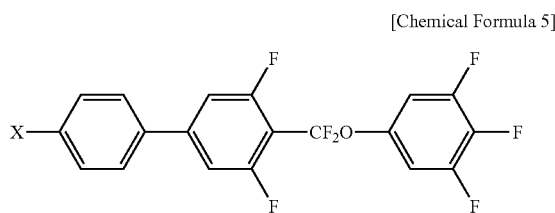

wherein X is an alkyl with a carbon number of 3-7.

15. The liquid crystal composition of claim 14, further comprising:
about 5-7 wt % of a compound represented by Chemical Formula 2

[Chemical Formula 2]

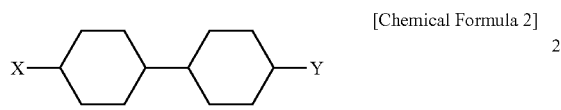

wherein X is an alkyl with a carbon number of 3-5, and Y is an alkenyl;
about 0.5-1.5 wt % of a compound represented by Chemical Formula 3

[Chemical Formula 3]

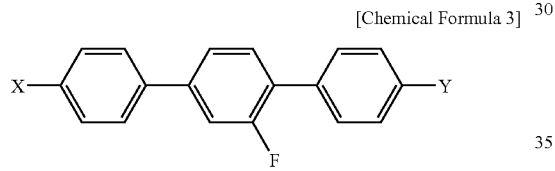

wherein X is an alkyl with a carbon number of 3-5, and Y is an alkyl with a carbon number of 5-7;
about 18-24 wt % of a compound represented by Chemical Formula 4

[Chemical Formula 4]

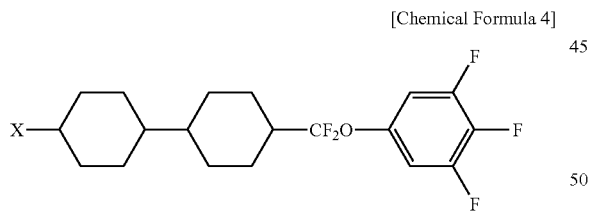

wherein X is an alkyl with a carbon number of 3-7;
about 9-11 wt % of a compound represented by Chemical Formula 6

[Chemical Formula 6]

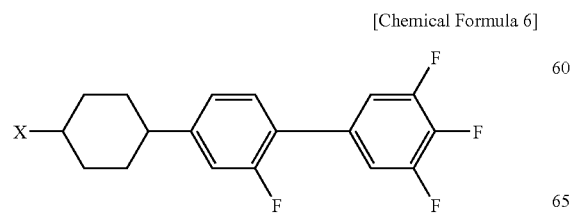

wherein X is an alkyl with a carbon number of 3-7; and
about 8-10 wt % of a compound represented by Chemical Formula 7,

[Chemical Formula 7]

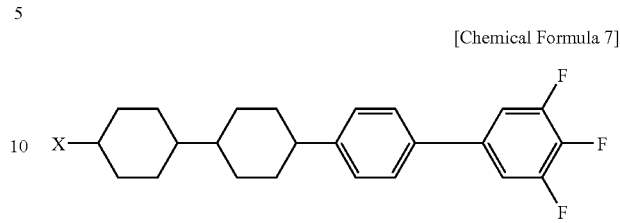

wherein X is an alkyl with a carbon number of 3-7, and
wherein the sum of the compounds represented by Chemical Formulas 1 to 8 forms about 100 wt %.

16. The liquid crystal composition of claim 15, wherein a phase transition temperature (Tni) is in a range of about 74-76° C., a refractive anisotropy ($\Delta n$) is in a range of about 0.099-0.11, a dielectric anisotropy ($\Delta \epsilon$) is in a range of about 12.5-13.0, and a rotation viscosity ($\gamma 1$) is in a range of about 75-84 mPa·s.

17. The liquid crystal composition of claim 13, wherein a phase transition temperature (Tni) is in a range of about 74-76° C., a refractive anisotropy ($\Delta n$) is in a range of about 0.099-0.11, a dielectric anisotropy ($\Delta \epsilon$) is in a range of about 12.5-13.0, and a rotation viscosity ($\gamma 1$) is in a range of about 75-84 mPa·s.

18. A liquid crystal composition comprising:
about 28 wt % of a compound represented by Chemical Formula 1

[Chemical Formula 1]

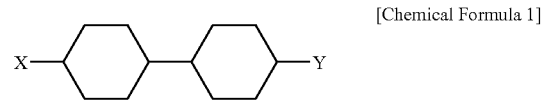

wherein X is an alkyl with a carbon number of 2, and Y is an alkenyl,
about 6 wt % of a compound represented by Chemical Formula 2

[Chemical Formula 2]

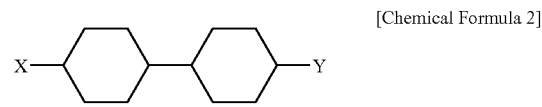

wherein X is an alkyl with a carbon number of 3-5, and Y is an alkenyl;
about 1 wt % of a compound represented by Chemical Formula 3

[Chemical Formula 3]

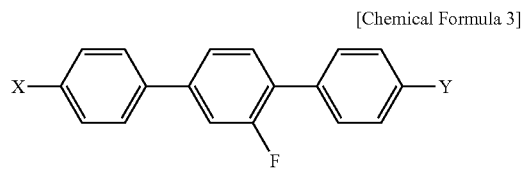

wherein X is an alkyl with a carbon number of 3-5, and Y is an alkyl with a carbon number of 5-7;

about 21 wt % of a compound represented by Chemical Formula 4

[Chemical Formula 4]

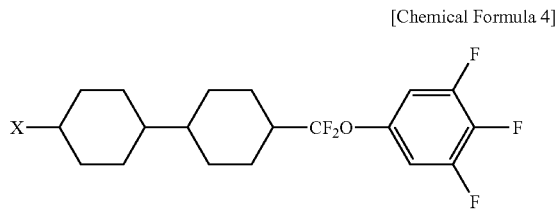

wherein X is an alkyl with a carbon number of 3-7;
about 15 wt % of a compound represented by Chemical Formula 5

[Chemical Formula 5]

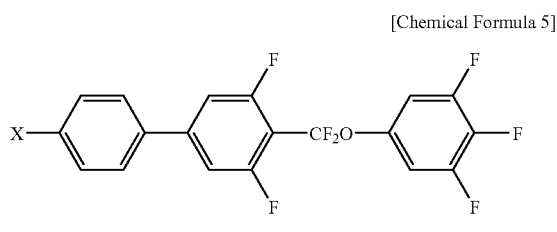

wherein X is an alkyl with a carbon number of 3-7;
about 10 wt % of a compound represented by Chemical Formula 6

[Chemical Formula 6]

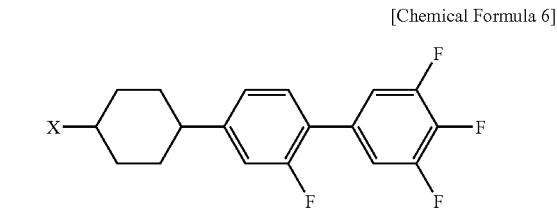

wherein X is an alkyl with a carbon number of 3-7;

about 9 wt % of a compound represented by Chemical Formula 7

[Chemical Formula 7]

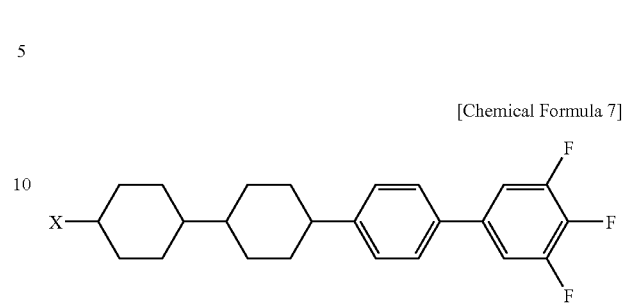

wherein X is an alkyl with a carbon number of 3-7; and
about 10 wt % of a compound represented by Chemical Formula 8

[Chemical Formula 8]

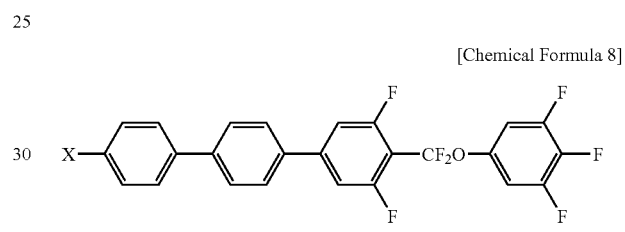

wherein X is an alkyl with a carbon number of 3-7.

* * * * *